United States Patent [19]

Bro

[11] 4,048,404
[45] Sept. 13, 1977

[54] ELECTROPHYSICHEMICAL DEVICE

[75] Inventor: Per Bro, Andover, Mass.

[73] Assignee: P. R. Mallory & Co. Inc., Indianapolis, Ind.

[21] Appl. No.: 665,154

[22] Filed: Mar. 8, 1976

Related U.S. Application Data

[63] Continuation of Ser. No. 65,174, Aug. 19, 1970, abandoned.

[51] Int. Cl.$^2$ .............................................. H01M 6/04
[52] U.S. Cl. .................................... 429/199; 429/219; 429/222; 429/229
[58] Field of Search ...................... 136/24, 20, 30, 155, 136/153, 6, 100, 83; 429/199, 219, 222, 229

[56] References Cited

U.S. PATENT DOCUMENTS

| | | | |
|---|---|---|---|
| 1,662,866 | 3/1928 | Salazar et al. | 136/20 |
| 2,566,114 | 8/1951 | Bloch | 136/6 |
| 2,919,216 | 12/1959 | Corren | 136/155 |
| 2,945,078 | 7/1960 | Chapman et al. | 136/20 |
| 3,258,367 | 6/1966 | Robinson | 136/100 |
| 3,393,093 | 7/1968 | Shaw et al. | 136/20 X |
| 3,413,154 | 11/1968 | Rao | 136/100 |
| 3,450,569 | 6/1969 | Dumas et al. | 136/100 |

*Primary Examiner*—C. F. LeFevour
*Attorney, Agent, or Firm*—Ronald S. Cornell; Israel Nissenbaum; Charles W. Hoffmann

[57] ABSTRACT

A fast chargeable and rechargeable energy storage system to serve as an electrical power supply, that can be fully charged or recharged in less than a minute, consisting of an electric cell with two polar electrodes, as to anode and cathode, with an electrolyte between them, in which the anode and the electrolyte are essentially non-gassing, and the operation during charge is a coupling of a chemical process with an electrochemical process. Circuit voltage is open 0.75 volt and energy storage capacity about 37.5 milliwatt hours in presently available units of small size.

6 Claims, 2 Drawing Figures

ELECTROPHYSICHEMICAL DEVICE

This is a continuation of application Ser. No. 65,174, filed Aug. 19, 1970, now abandoned.

This invention relates to energy storage systems, here specifically a fast charging rechargeable system for convenience here termed a tachode.

The underlying charge transfer process of all electrical storage devices is intrinsically very rapid. However, in order to store appreciable quantities of charge, the charge must be transferred and stored in bulk form in extended geometrical structures and this is intrinsically a slow process. These characteristics may be illustrated by comparing the charging rate capabilities of capacitors and batteries. The former depend on the transfer of conduction electrons and the alignment of molecular or atomic dipoles and the latter on the transfer of charge associated with bulk atoms. The operation of both devices is governed by the equation:

$$i = k\, q \exp(-kt)$$

and some characteristic values are:

|  | $1/k$ | $q$ | Charging time* | Charge density |
|---|---|---|---|---|
| Capacitors | $5 \times 10^{-5}$ sec | 1 amp.sec. | $5 \times 10^{-5}$ sec | $6 \times 10^{-6}$ amp.hrs. per in$^3$ |
| PbO$_2$/Pb battery | $3.5 \times 10^3$ sec | 1 amp.sec. | 8300 sec | 1.0 amp.hrs. per in$^3$ |

*Time required to reach 90% of q.
q = stoichiometric capacity.

It may be seen that capacitors are very fast, but they have low specific capacities. Batteries are capable of storing much greater quantities of charge, but they require approximately $10^8$ times as much time to be charged.

The object of this invention is to provide a tachode, or energy storage device for use as a chargeable and rechargeable device that may be utilized for the storage of electrical energy and charged rapidly to high energy density.

Tachodes provide the best solution to applications which require charging periods below a minute to give useful capacities for the extended operation of communication or actuating devices. Experimental tachodes have been made with ($1/k$) values of 20 and with specific capcities of approximately 0.05 ampere hours per cubic inch. It is believed that ($1/k$) values near unity can be reached, i.e. charging rates above 1000C.

Time periods in excess of about 6 minutes are required to recharge storage batteries to their rated capacities. Attempts to charge batteries at higher rates lead to destructive physical and chemical processes which ruin the batteries. Capacitors can be charged at very high rates but their energy densities are too low for their use as portable energy sources.

The advantage of a tachodic device is that it can be charged very rapidly, in much less than 6 minutes, without any attendant destructive processes, and it gives energy densities comparable to conventional storage batteries. Furthermore, it is a rechargeable device.

A tachode is an electrophysichemical device comprising two electronically conductive elements separated by a dielectric spacer and a suitable ionic conductor; all encased in a housing.

The ionic conductor may be a suitable salt containing a little water or a dilute solution of same in water, or any intermediate composition. Salt mixtures may also be used. Typical salts are zinc halides and cadmium halides. The polar elements may be silver and zinc or other combinations, the basic requirement being that one of the elements must form an insoluble, fusible salt when oxidized at a high rate and the other should not dissolve an appreciable amount of the metal formed when the ionic conductor is reduced. The dielectric material should be capable of retaining its structural integrity at elevated temperatures and it should be capable of withstanding compression loads.

The operation of a tachode at voltages above the rating of a single unit may be accomplished by stacking several units into a multicellular structure and by the use of bipolar elements.

A important part of each element is its associated thermal sink. The thermal sinks may vary from flat to porous backings for the active elements to external radiation control surfaces. The geometry of the thermal system depends upon the capacity and operating regime of the tachode. The active elements themselves may also assume various configurations in conformity with the operating regime. Negative heat sinks, i.e. heat sources, may also be incorporated into the elements which are driven by an external power source or by the charging current to the tachode.

Figure 1:
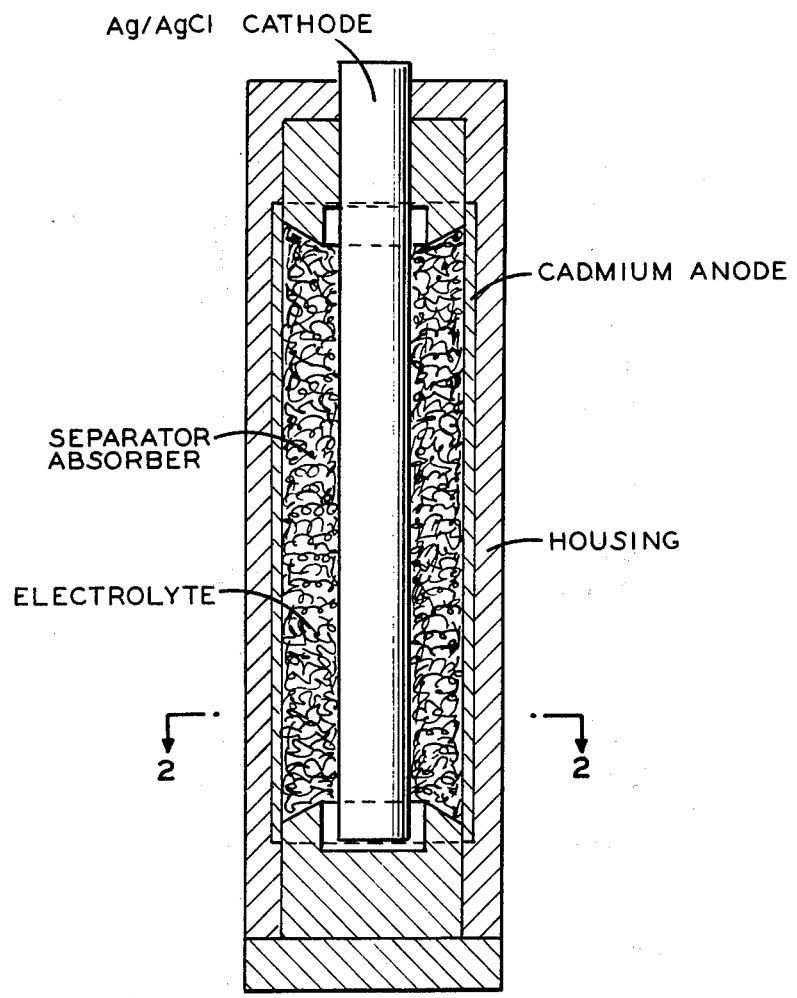
FIG. 1 is a vertical cross sectional view of a battery made in accordance with the invention.
Figure 2:
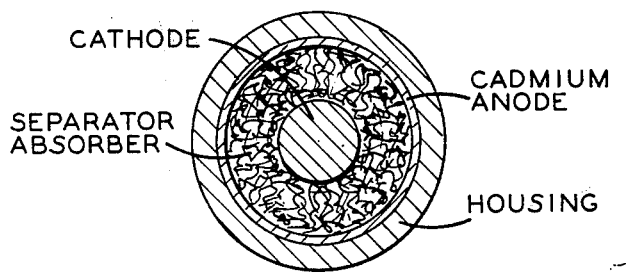
FIG. 2 is a sectional view taken on line 2—2 of FIG. 1.

The operation of a tachode is illustrated with reference to the Ag/1/2 saturated ZnCl$_2$/Pb system. The device is charged by passing a high anodic current through the Ag element, greater than 0.1 amp/cm$^2$, and as high as 10 amp/cm$^2$, depending on the structure of the element. The AgCl formed on the Ag plate forms a resistive film which experiences a rapid rate of heating to the point of fusion at which point the formation of more AgCl occurs rather than oxygen and/or chlorine evolution. Metallic zinc is formed on the surface of the Pb element.

The heat generated at the Ag plate is dissipated to the heat sinks to allow charge densities of 0.05-5 mah/cm$^2$ to be reached. Excessive heat sinking prevents fusion of the AgCl and the tachode fails to operate satisfactorily. The spacer structure also affects the heat dissipation to and/or from elements and must be properly designed.

Tachodes deliver their stored energy in the manner of conventional batteries and upon discharge the original state is restored from which recharging is initiated. Pulse charging or other programmed charging current profiles can be used to increase the charge density or to vary the charging rate of the system. Typical charging rates vary between a fraction of a minute to fractions of a second.

EXAMPLE 2 inch diameter circular elements, 4mm apart
5 mil thick Ag element
20 mil thick Zn element
glass fiber dielectric spacer
Charging current 2 amp, 50 seconds
Charging rate 72C
Open circuit voltage 0.85V

| Cycle | % Charge Recovery to 0.6V |
| --- | --- |
| 1 | 96 |
| 2 | 96 |
| 3 | 96 |
| 4 | 95.3 |
| 5 | 94.5 |
| 6 | 96.6 |
| 7 | 96.7 |

Certain tachodes suffer from the deficiency that the zinc electrode reacts with the electrolyte to form a gas whose presence exerts a deleterious influence on the operation of the tachode. In an improved modification, the gassing problem is eliminated or reduced to an acceptable level by the use of a cadmium electrode and a cadmium chloride electrolyte, the latter containing added salts to enhance its electrical conductivity. It was discovered that the cadmium chloride exerted a deleterious effect on the silver chloride film on the cathode. In the presence of cadmium chloride the electrochemically sound silver chloride film recrystallized very rapidly to an electrochemically unavailable form, and the tachode gave low discharge efficiencies. It was also discovered that the recrystallization of the silver chloride did not occur, or occurred sufficiently slowly to be accpetable when the cadmium chloride concentration was below approximately 0.1M $CdCl_2$. Such low concentrations eliminated any possibility of charging the tachodes at the high rates of 10 coulomb and above.

The improved modification provides a new combination and method for achieving high electrical charging rates of 10 coulomb and above for use with tachodes containing cadmium anodes, cadmium chloride electrolytes, and silver chloride cathodes. An electrolyte containing cadmium chloride, zinc chloride, and inert salts is employed to attain the desired conductivity. Zinc chloride does not ruin the silver chloride cathode. On high rate charge, zinc is formed on the anode. Said zinc then displaces cadmium ions in solution and a cadmium anode is formed subsequent to the high rate electrical charge. Essentially all the zinc dissolves to form an equivalent amount of cadmium. The initial cadmium chloride concentration is adjusted to give a final concentration after displacement of 0.1M or less. By this means I have accomplished a high rate of electrical charge, the use of a non-gassing cadmium anode, and the preservation of the integrity of the silver chloride electrode, which objectives were not simultaneously attainable hitherto.

The usefulness of the invention was demonstrated by charging and discharging a cell as shown in FIG. 1, as a vertical transverse section of the cell, the elements of which are identified by legends. The cell comprised an inner cylindrical silver rod in a cylindrical cell housing of plexiglass. The silver rod was surrounded by a layer of an absorber-separator material and a cylindrical cadmium electrode. The cell was completely filled with an electrolyte containing:
 0.15M $CdCl_2$
 2.0M $ZnCl_2$
 1.5M $NaClO_4$ The cell was preconditioned by means of three short cycles; and the operated normally:

| Cycle | Charge Amp | Charge Min | Discharge Amp | Efficiency % |
| --- | --- | --- | --- | --- |
| 1 precond | 1.0 | 0.5 | .10 | 93.4 |
| 2 " | 1.0 | 1.0 | .10 | 95.1 |
| 3 " | 1.0 | 1.0 | .10 | 95.7 |
| 4 regular | 1.0 | 2.0 | .10 | 96.5 |
| 5 " | 1.0 | 2.0 | .10 | 97.5 |
| 6 " | 1.0 | 2.0 | .10 | 97.5 |
| 7 " | 1.0 | 2.0 | .10 | 98.2 |
| 8 " | 1.0 | 2.0 | .10 | 97.2 |
| 9 " | 1.0 | 2.0 | .10 | 97.2 |
| 10 " | 1.0 | 2.0 | .10 | 97.5 |

It was found that very high efficiencies were obtained at the 30 coulomb charging rate through several cycles.

THE SCOPE OF THE INVENTION

There are two aspects which are fundamental to the invention. First, it is uniquely applicable to the $Cd/ZnCl_2$, $CdCl_2/AgCl/Ag$ system to achieve the stated improvements. Secondly, it provides a means for effecting a very rapid electrical charging of an anode/electrolyte combination which has an intrinsic low rate capability. The second effect is obtained by the unique coupling of an electrochemical and a chemical process. This coupling appears to be a novel application of a recognized principle of chemistry, i.e. the principle of electrochemical displacement. However, here, this principle is used to accomplish a new result not hitherto recognized as possible in the state of the art in battery technology.

What is claimed is:

1. An electrical component having a characteristic of both a battery and a capacitor in having a fast chargeable rate much greater than previously available storage batteries comprising; a positive electrode, said positive electroce including a silver element having an active surface layer of solidified, previously fused silver chloride thereon, said silver chloride layer constituting an insoluble, resistive film formed on said silver during charging by passing a high anodic current through the silver element greater than 0.1 amp/$cm^2$, which resistive film will rapidly heat to fusion temperature during charging; a negative electrode insulatingly spaced from said positive electrode, said negative electrode being cadmium or zinc; an ionic conductor disposed between said two electrodes; said ionic conductor being water and a zinc or cadmium halide or a mixture thereof; a dielectric spacer between said two electrodes, said spacer being capable of retaining its structural integrity at elevated temperatures and capable of withstanding compressive loading; and an encasing housing.

2. An electrical component as in claim 1 in which said negative electrode is cadmium, and said ionic conductor comprises a mixture of zinc chloride and cadmium chloride.

3. An electrical component as in claim 1 wherein the geometry of said positive electrode is such that the heat generated during charging is adequate to fuse said silver chloride during rapid charging of said electrical component.

4. An electrical component as in claim 2 in which said ionic conductor comprises cadmium chloride, zinc chloride, and a salt to attain desired conductivity.

5. An electrical component, as in claim 4, in which said salt is $NaClO_4$.

6. An electrical component as in claim 3 wherein said negative electrode is cadmium and said ionic conductor is an aqueous electrolyte containing zinc chloride, cadmium chloride and sodium perchlorate.

* * * * *